April 30, 1929.  W. J. CARSON  1,711,041
PERPETUAL CALENDAR
Filed July 11, 1928   4 Sheets-Sheet 1

WILLIAM J. CARSON
INVENTOR

PER
Minier & Fike
ATTORNEYS

April 30, 1929.  W. J. CARSON  1,711,041
PERPETUAL CALENDAR
Filed July 11, 1928    4 Sheets-Sheet 2
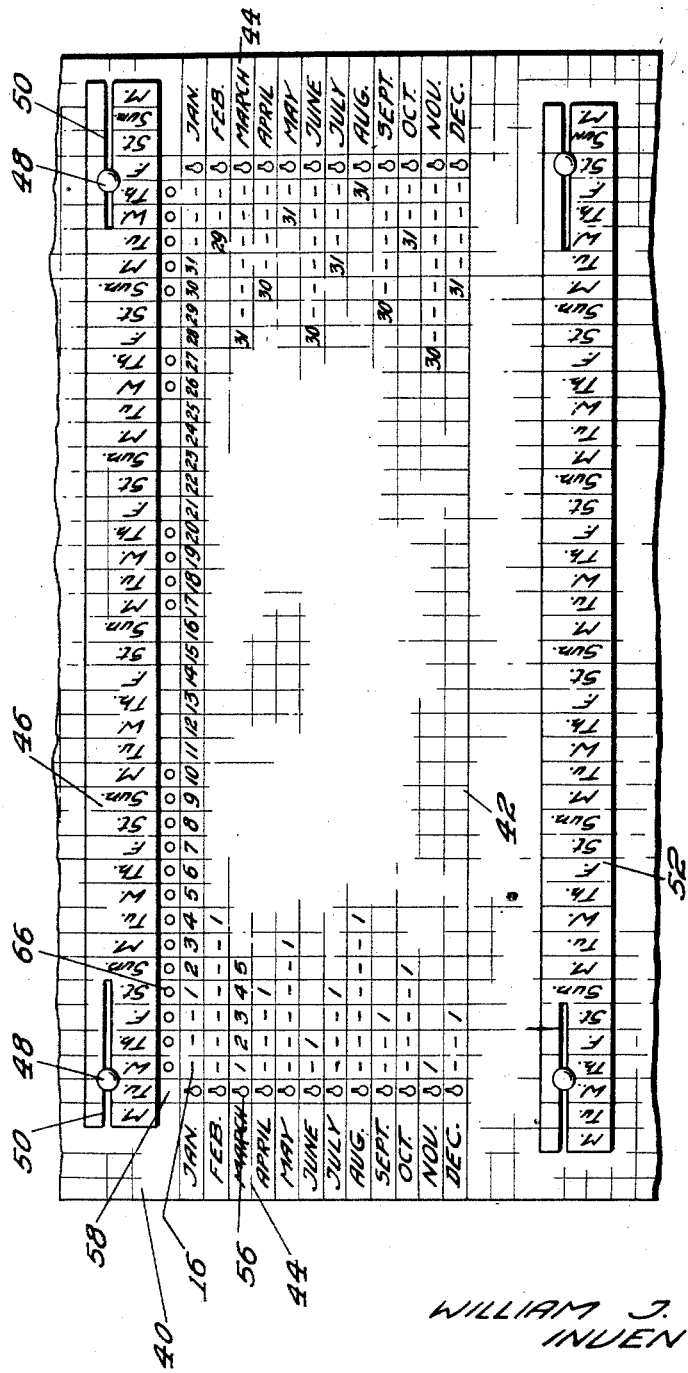
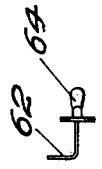
WILLIAM J. CARSON
INVENTOR
PER Minier & Fike
ATTORNEYS April 30, 1929.  W. J. CARSON  1,711,041
PERPETUAL CALENDAR
Filed July 11, 1928   4 Sheets-Sheet 3

WILLIAM J. CARSON
INVENTOR

PER
Minier & Fike
ATTORNEYS

April 30, 1929.  W. J. CARSON  1,711,041
PERPETUAL CALENDAR
Filed July 11, 1928   4 Sheets-Sheet 4

| | | | | | | | | | | |
|---|---|---|---|---|---|---|---|---|---|---|
| Sun. | | 1606 | 1617 | 1623 | 1634 | 1645 | 1651 | 1662 | 1673 | 1679 | 1690 |
| M. | 1601 | 07 | 18 | 29 | 35 | 46 | 57 | 63 | 74 | 85 | 91 |
| Tu. | 1602 | 13 | 19 | 30 | 41 | 47 | 58 | 69 | 75 | 86 | 97 |
| W. | 1603 | 14 | 25 | 31 | 42 | 53 | 59 | 70 | 81 | 87 | 98 |
| St. | 1605 | 11 | 22 | 33 | 39 | 50 | 61 | 67 | 78 | 89 | 95 |
| Th. | 1609 | 15 | 26 | 37 | 43 | 54 | 65 | 71 | 82 | 93 | 1699 |
| F. | 1610 | 1621 | 1627 | 1638 | 1649 | 1655 | 1666 | 1677 | 1683 | 1694 | |
| F. | 1700 | 1706 | 17 | 23 | 34 | 45 | 51 | 62 | 73 | 79 | 1790 |
| St. | 1701 | 07 | 18 | 29 | 35 | 46 | 57 | 63 | 74 | 85 | 91 |
| Sun. | 1702 | 13 | 19 | 30 | 41 | 47 | 58 | 69 | 75 | 86 | 97 |
| M. | 1703 | 14 | 25 | 31 | 42 | 53 | 59 | 70 | 81 | 87 | 98 |
| Th. | 1705 | 11 | 22 | 33 | 39 | 50 | 61 | 67 | 78 | 89 | 95 |
| Tu. | 1709 | 15 | 26 | 37 | 43 | 54 | 65 | 71 | 82 | 93 | 1799 |
| W. | 1710 | 1721 | 1727 | 1738 | 1749 | 1755 | 1766 | 1777 | 1783 | 1794 | |
| W. | 1800 | 1806 | 17 | 23 | 34 | 45 | 51 | 62 | 73 | 79 | 1890 |
| Th. | 1801 | 07 | 18 | 29 | 35 | 46 | 57 | 63 | 74 | 85 | 91 |
| F. | 1802 | 13 | 19 | 30 | 41 | 47 | 58 | 69 | 75 | 86 | 97 |
| St. | 1803 | 14 | 25 | 31 | 42 | 53 | 59 | 70 | 81 | 87 | 98 |
| Tu. | 1805 | 11 | 22 | 33 | 39 | 50 | 61 | 67 | 78 | 89 | 95 |
| Sun. | 1809 | 15 | 26 | 37 | 43 | 54 | 65 | 71 | 82 | 93 | 1899 |
| M. | 1810 | 1821 | 1827 | 1838 | 1849 | 1855 | 1866 | 1877 | 1883 | 1894 | |
| M. | 1900 | 1906 | 17 | 23 | 34 | 45 | 51 | 62 | 73 | 79 | 1990 |
| Tu. | 1901 | 07 | 18 | 29 | 35 | 46 | 57 | 63 | 74 | 85 | 91 |
| W. | 1902 | 13 | 19 | 30 | 41 | 47 | 58 | 69 | 75 | 86 | 97 |
| Th. | 1903 | 14 | 25 | 31 | 42 | 53 | 59 | 70 | 81 | 87 | 98 |
| Sun. | 1905 | 11 | 22 | 33 | 39 | 50 | 61 | 67 | 78 | 89 | 95 |
| F. | 1909 | 15 | 26 | 37 | 43 | 54 | 65 | 71 | 82 | 93 | 1999 |
| St. | 1910 | 1921 | 1927 | 1938 | 1949 | 1955 | 1966 | 1977 | 1983 | 1994 | |

| Beg. | Th. | Ends | F. | 1604 | 1632 | 1660 | 1688 | Beg. | Tu. | Ends | W. | 1704 | 1732 | 1760 | 1788 |
|---|---|---|---|---|---|---|---|---|---|---|---|---|---|---|---|
| -"- | Tu. | -"- | W. | 8 | 36 | 64 | 92 | -"- | S. | -"- | M. | 8 | 36 | 64 | 92 |
| -"- | S. | -"- | M. | 12 | 40 | 68 | 1696 | -"- | F. | -"- | St. | 12 | 40 | 68 | 1796 |
| -"- | F. | -"- | St. | 16 | 44 | 72 | | -"- | W. | -"- | Th. | 16 | 44 | 72 | |
| -"- | W. | -"- | Th. | 20 | 48 | 76 | | -"- | M. | -"- | Tu. | 20 | 48 | 76 | |
| -"- | M. | -"- | Tu. | 24 | 52 | 80 | | -"- | St. | -"- | S. | 24 | 52 | 80 | |
| -"- | St. | -"- | S. | 1628 | 1656 | 1684 | | -"- | Th. | -"- | F. | 1728 | 1756 | 1784 | |
| -"- | S. | -"- | M. | 1804 | 1832 | 1860 | 1888 | -"- | F. | -"- | St. | 1904 | 1932 | 1960 | 1988 |
| -"- | F. | -"- | St. | 8 | 36 | 64 | 92 | -"- | W. | -"- | Th. | 8 | 36 | 64 | 92 |
| -"- | W. | -"- | Th. | 12 | 40 | 68 | 1896 | -"- | M. | -"- | Tu. | 12 | 40 | 68 | 96 |
| -"- | M. | -"- | Tu. | 16 | 44 | 72 | | -"- | St. | -"- | S. | 16 | 44 | 72 | 2000 |
| -"- | St. | -"- | S. | 20 | 48 | 76 | | -"- | Th. | -"- | F. | 20 | 48 | 76 | |
| -"- | Th. | -"- | F. | 24 | 52 | 80 | | -"- | Tu. | -"- | W. | 24 | 52 | 80 | |
| -"- | Tu. | -"- | W. | 1828 | 1856 | 1884 | | -"- | S. | -"- | M. | 1928 | 1956 | 1984 | |

FIG. 5

WILLIAM J. CARSON
INVENTOR

PER
Minier & Fike
ATTORNEYS

Patented Apr. 30, 1929.

1,711,041

UNITED STATES PATENT OFFICE.

WILLIAM J. CARSON, OF SAN FRANCISCO, CALIFORNIA.

PERPETUAL CALENDAR.

Application filed July 11, 1928. Serial No. 291,930.

This invention relates to improvements in perpetual calendars and has for one of its principal objects the provision of means for determining upon what day of the week any date, past, present or future, will fall.

One of the important objects of this invention is to provide a perpetual calendar which can be used from year to year with a minimum of adjustments, it being unnecessary after one adjustment is made to change the same for a year. In addition, means are provided for determining past or future days and dates without altering the current year adjustment.

Another important object of the invention is the provision of a perpetual calendar which is simple in its use as such and in addition possesses all the attributes of the ordinary calendar. Further, the calendar may be manufactured very economically, so as to be distributed free for purposes of advertising or given as souvenirs, as is the custom of merchants in the distribution of the ordinary calendars.

Other and further important objects of the invention will be apparent from the disclosures in the accompanying drawings and following specification.

The invention, in a preferred form, is illustrated in the drawings and hereinafter more fully described.

In the drawings:

Figure 2 is a slight modification of the invention showing an optional form of month arrangement.

Figure 3 is another modification of the device, the "month" columns being slidable.

Figure 4 is an end view of the device shown in Figure 3.

Figure 5 is a table of the beginning and ending days of each year for a period of 400 years.

Figure 7 is a detail side view of one of the month indicator pins.

Figure 8 is a detail front view of the pin shown in Figure 7.

As shown in the drawings:

Figure 1:
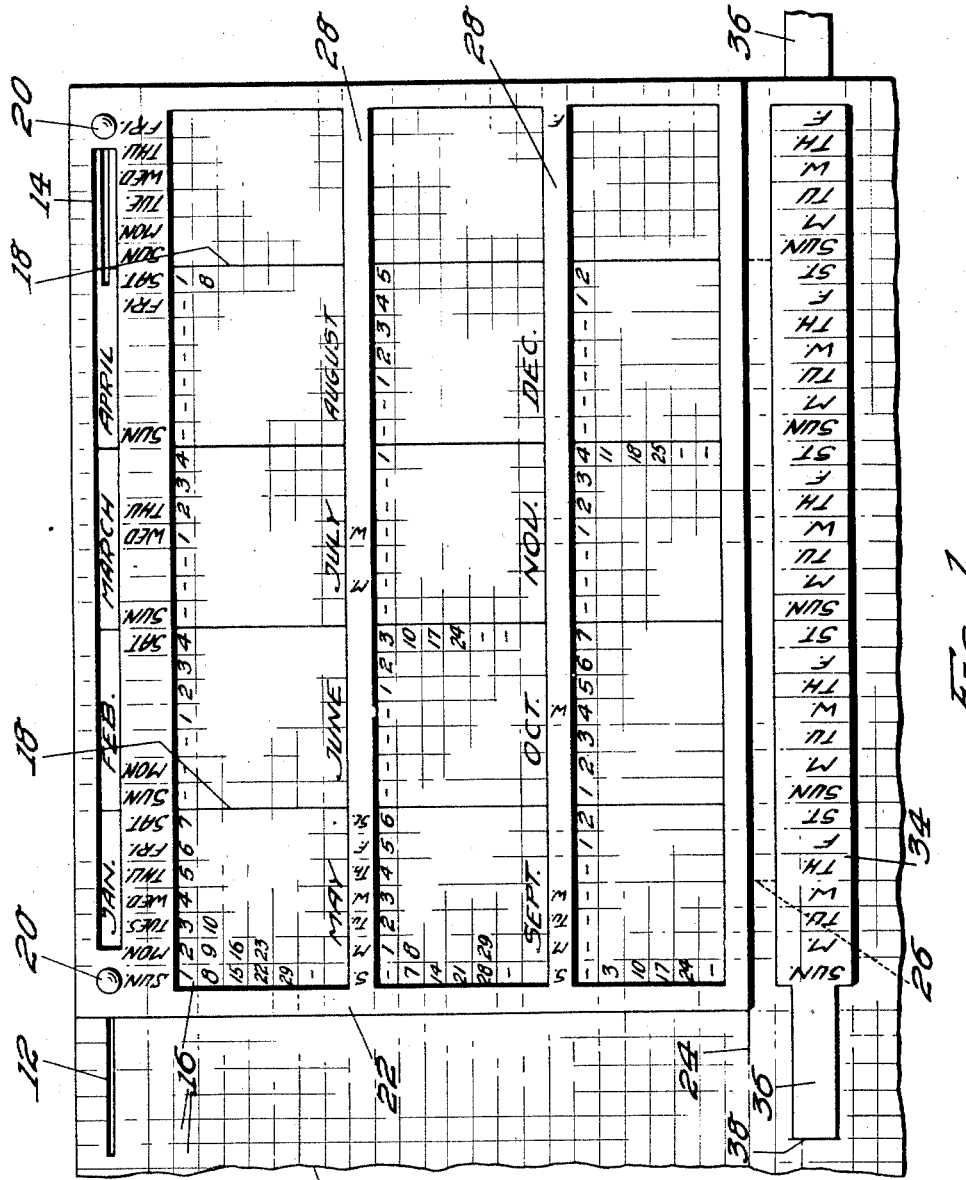
Figure 1 is a front elevation of the perpetual calendar, illustrating in particular the divisional arrangement of the various months of the year.

The reference numeral 10 indicates generally the base or back of the calendar which is preferably constructed of cardboard, wood, sheet metal, celluloid or any other substance having like characteristics. A pair of slits 12 and 14 are provided in the upper portion of the back 10. A series of thirty-four squares or subdivisions 16 are provided upon the back between the right end of the slit 12 and the right end of the slit 14. These subdivisions 16 are divided horizontally into groups of seven, as indicated by the heavy division lines 18, the last group thus formed containing but six subdivisions. Vertically the back is divided into twenty-three squares or subdivisions 16. A rectangle is thus formed upon the back comprising a series of subdivisions 16, thirty-four on one side and twenty-three on the other.

Positioned upon the back 10 by means of rivets or the like 20 is a framework 22 preferably constructed of the same material as that of the back 10. The rivets 20 are loosely positioned in the slits 12 and 14 and are slidable therein. To guide the lower portion of the frame 22 in its slidable travel upon the back an opening 24 is provided in the back into which a tab or tongue 26 integral with the frame 22 is adapted to slide.

The frame 22 is provided with two horizontal cross-portions 28 which divide the aforementioned rectangle of squares on the back vertically into three groups, two groups of seven squares each as shown at 16 and one group of six squares. Thus it is seen that a series of fifteen large rectangles is formed bounded by the lines 18 and the divisions 28. Upon the subdivisions 16 of each of the left hand twelve large rectangles above mentioned are printed, engraved or otherwise impressed, figures corresponding to the days of the month. A notation of the months of the year, January, February, etc., is placed above the respective month rectangles, as can be readily seen in Figure 1.

Impressed upon the top of the frame 22 and upon each of the cross-members 28 and in alignment with the vertical columns of the subdivisions 16 are the days of the week, starting with Sunday and ending with Friday. The three large rectangles at the right of Figure 1, one at the end of each of the three horizontal tiers of month rectangles are blank and merely provide space for the sliding of the frame 22 to indicate the proper notation of the years whose first day begins on days other than Sunday.

Obviously one set of figures such as is presented upon the back 10 will not provide for both leap years and ordinary years, inasmuch, as the additional day of each leap year changes the sequence of the days following February 29th. Hence, to provide for leap year a similar construction is preferably formed on the rear of the back 10 with the additional day added in February, the subsequent days following in corresponding sequence. The remaining constructional details of the calendar are unchanged.

Referring particularly to Figure 5, a set of tables 30 and 32 are shown. Table 30 is a list of the beginning and ending days of the ordinary years over a period of 400 years in which time our calendar makes one complete cycle. By ordinary years is meant all years exclusive of leap years, that is years in which February has twenty-eight days. Table 32 is a list of the beginning and ending days of all the leap years in the span of 400 years.

In the preferable embodiment of the calendar these tables 30 and 32 are printed or otherwise indicated upon the back 10. The location of the tables is optional, but it is desirable that the tables 30 be placed upon the same side of the back 10 as is the calendar for the ordinary years, to the right or left of the calendar or at its top or bottom. The table 32 is likewise similarly positioned with respect to the leap year calendar.

In operation, the first step to be taken is the finding, on the table 30 or 32 as the case may be, the day upon which falls January first. Assume for the sake of example that January first falls on Sunday, then the frame 22 is adjusted so that "Sun." on the frame is positioned immediately above January first. The calendar is then set for the year.

To find the day upon which a past or future date fell or will fall a slide 34 is provided preferably at the bottom of the calendar, as shown best in Figure 1. The said slide is preferably constructed of the same material as that comprising the back 10 and frame 22 and is of a length equal to 34 subdivisions 16. Upon these are printed or engraved a series of the days of the week, beginning with Sunday and ending with Friday.

The member 34 is slidably mounted upon the back 10 by means of tongues 36 integral with the slide 34, one being positioned at each end of the same, the tongues operating in vertical slits 38 formed in the back 10. By the use of the slide 34 in conjunction with the calendar and tables 30 and 32 it is obvious that the day of the week upon which any date included in the 400 year period covered by the tables can be found, and inasmuch as the calendar repeats itself every 400 years the day upon which any date falls can thus be found without the necessity of disturbing the current year adjustment.

Referring to Figure 2, a slight modification of the calendar is shown. In this embodiment a back 40, preferably constructed of materials similar to those used in the construction of the back 10 of the principal invention, is provided, having indicated upon the same a series of subdivisions 16 grouped in the form of a rectangle 42, the length of the said rectangle comprising thirty-nine subdivisions whereas the height comprises thirteen of the same.

A vertical month column 44 is provided at each side of the rectangle 42, and in horizontal alignment with each month of the same is a list of the days of the month, as shown in the drawing. Above the rectangle 42 is slidably mounted a current year day indicator 46, the same being mounted upon the back 40 by means of a pair of rivets or the like 48 which operate in slots 50, one being formed in each end of the slide 46. The slots are so formed that the overall travel of the slide will be equal to six subdivisions 16. An auxiliary slide 52 similar to the main slide 46 is preferably positioned at the bottom of the rectangle 42 and is used the same as the slide 34 of the main invention in conjunction with the tables 30 and 32.

Figure 6:
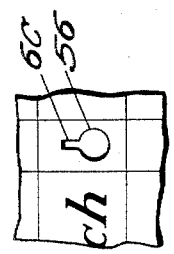
Figure 6 is a detail view of one of the month indicator openings.

A novel means of designating the current month of the year comprises a series of openings 56 positioned in a vertical column 58 positioned at each side of the rectangle 42. The openings 56 are circular in shape and are provided with a keyway 60, as best shown in detail in Figure 6, into which a key 62, best shown in Figure 7 is adapted to fit. The head 64 of the key is preferably coated with a bright colored paint, enamel or the like so as to readily catch the eye thereby indicating the particular month of the calendar which is current. An opening 66 is provided at the top of each vertical column of squares 16 into which brightly colored pins or the like may be inserted to designate the current day of the month.

Similar to the scheme of the principal invention two calendars must be provided, one for ordinary years and one for leap years, and as in the case of the principal invention the ordinary year calendar may be positioned on one side of the back 44 whereas the leap year calendar can be placed on the reverse side of the same. The tables 30 and 32 are also relatively positioned with respect to their corresponding years.

Another modification of the invention is shown in Figures 3 and 4, in which the reference numeral 66 indicates generally the back or base of the calendar, preferably constructed of the same material as that used for the back 10 of the principal invention. Rigidly positioned upon the back 66 by means of glue, rivets or the like is a frame 68 raised slightly above the surface of the back. At each end of the frame 68 are impressed or printed the various months of the year forming a vertical column 70.

The frame 68 has a rectangular opening 72 in its central portion in which are positioned twelve longitudinally slidable strips 74, each of the said strips corresponding to a month of the year as designated by the month column 70, and each having indicated thereon the dates of the days of the month. Notches 76 are provided in the central portion of each of the strips to facilitate the ready moving thereof. Indicated by appropriate means at the top of the frame 68 is a repeating series of the days of the week, each day being adapted to be in alignment with the ordinals of the month as designated by the slides 74. Thus it is seen that instead of shifting the day column as is done in the principal invention, the inverse operation of shifting the month ordinals is used to make the calendar conform to the current year. The tables 30 and 32 are a necessary part of this modification and it is desirable that they appear upon the face of the back 66, preferably at the bottom or top of the same. Inasmuch as the month ordinals are movable with respect to the day column only one calendar is necessary for both the ordinary years and leap years.

It is apparent that herein is provided a perpetual calendar which is exceedingly simple to operate, and its flexibility is unsurpassed in finding past or future days and dates. The manufacturing cost of the calendar is a minimum and when made of appropriate materials, as indicated above, will last for a lifetime.

I am aware that many changes may be made and numerous details of construction varied throughout a wide range without departing from the principles of this invention, and I therefore do not purpose limiting the patent granted hereon otherwise than as necessitated by the prior art.

I claim as my invention:

1. A calendar including in combination, a back having a series of month-ordinals thereon, a frame slidably positioned on the face of the back, a repeating series of the days of the week indicated upon the frame, and additional means for determining the day upon which a past date fell.

2. A calendar including in combination, a back having a series of month-ordinals thereon, a frame slidably positioned on the face of the back, a repeating series of the days of the week indicated upon the frame, and additional means for determining the day upon which a future date will fall.

3. A calendar including in combination, a back having a series of month-ordinals thereon, a frame slidably positioned on the face of the back, a repeating series of the days of the week indicated upon the frame, and additional means for determining upon what date a predetermined day will fall, said means comprising a table on the rear face of the back.

4. A calendar including a combination, a back having a series of month-ordinals thereon, a frame slidably positioned on the face of the back, a repeating series of the days of the week indicated upon the frame, and means for determining the day upon which a past date fell, said means comprising a strip slidably mounted on the back, and a repeating series of the days of the week indicated on the strip.

5. A calendar including in combination, a back having a series of month-ordinals thereon, a frame slidably positioned on the face of the back, a repeating series of the days of the week indicated upon the frame, and means for determining the day upon which a future date will fall, said means comprising a strip slidably mounted on the back, and a repeating series of the days of the week indicated on the strip.

6. A calendar including in combination, a back having a series of month-ordinals thereon, a frame slidably positioned on the face of the back, a repeating series of the days of the week indicated upon the frame, and means for determining upon what date a predetermined day will fall, said means comprising a strip slidably mounted on the back, and a repeating series of the days of the week indicated on the strip.

7. In a perpetual calendar, a back having a series of month ordinals thereon, a pair of strips slidably mounted upon the face of the back, and a repeating series of days of the week indicated upon each strip.

8. In a perpetual calendar, a back having a series of month ordinals thereon, a pair of strips slidably mounted upon the face of the back, and a repeating series of days of the week indicated upon each strip, and means for designating the current month of the year and additional means for designating the current day of the month.

9. In a perpetual calendar, a back having a series of month ordinals thereon, a pair of strips slidably mounted upon the face of the back, and a repeating series of days of the week indicated upon each strip, and means for designating the current month of the year and additional means for designating the current day of the month, said means comprising indicator pins having colored heads, the back being provided with a plurality of openings, one opening corresponding to each month of the year and one opening corresponding to each of the repeating series of the days of the week.

10. A perpetual calendar, including in combination, a back, a frame integral with the back, the months of the year indicated in a vertical column on each end of the frame, a plurality of strips slidably mounted between the frame and the back, each strip corresponding to a month of the year, a series of day ordinals indicated on each strip, and a repeating series of the days of the week indicated upon the frame, the said day-ordinals adapted to align with the days of the repeating series.

11. In a perpetual calendar, a series of relatively slidable strips having columns of the days of the month thereon and the ordinals of the month and means for determining the appropriate setting of the said relatively slidable members to provide a current year calendar.

12. In a perpetual calendar, a series of relatively slidable strips having columns of the days of the month thereon and the ordinals of the month and means for determining the appropriate setting of the said relatively slidable members to provide a current year calendar, said means comprising a plurality of tables indicated upon the calendar, each said table designating the beginning and ending days of each year for one cyclic period of our modern calendar.

In testimony whereof I affix my signature.

WILLIAM J. CARSON.